US008817878B2

(12) United States Patent
Walls et al.

(10) Patent No.: US 8,817,878 B2
(45) Date of Patent: Aug. 26, 2014

(54) METHOD AND SYSTEM FOR MOTION ESTIMATION AROUND A FIXED REFERENCE VECTOR USING A PIVOT-PIXEL APPROACH

(75) Inventors: Frederick Walls, Norristown, PA (US); Richard Hayden Wyman, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1293 days.

(21) Appl. No.: 11/936,528

(22) Filed: Nov. 7, 2007

(65) Prior Publication Data
US 2009/0115909 A1 May 7, 2009

(51) Int. Cl.
*H04N 11/02* (2006.01)
(52) U.S. Cl.
USPC .................................................. 375/240.16
(58) Field of Classification Search
USPC .................................................. 375/240.16
See application file for complete search history.

(56) References Cited

U.S. PATENT DOCUMENTS

| | | | | |
|---|---|---|---|---|
| 5,978,031 A * | 11/1999 | Kim | .......... | 375/240.16 |
| 6,023,300 A * | 2/2000 | Han et al. | .......... | 375/240.16 |
| 6,317,136 B1 * | 11/2001 | Choi | .......... | 345/537 |
| 6,535,558 B1 * | 3/2003 | Suzuki et al. | .......... | 375/240.12 |
| 6,567,469 B1 * | 5/2003 | Rackett | .......... | 375/240.16 |
| 6,690,729 B2 * | 2/2004 | Hayashi | .......... | 375/240.16 |
| 6,757,432 B2 * | 6/2004 | Hijiri et al. | .......... | 382/232 |
| 6,987,805 B1 * | 1/2006 | Weckel et al. | .......... | 375/240 |
| 7,050,502 B2 * | 5/2006 | Yasunari et al. | .......... | 375/240.16 |
| 7,394,853 B2 * | 7/2008 | Kondo et al. | .......... | 375/240.16 |
| 7,408,986 B2 * | 8/2008 | Winder | .......... | 375/240.12 |
| 7,558,320 B2 * | 7/2009 | Winder et al. | .......... | 375/240.12 |
| 7,801,215 B2 * | 9/2010 | Bhaumik et al. | .......... | 375/240.16 |
| 7,864,982 B2 * | 1/2011 | Lee et al. | .......... | 382/107 |
| 8,194,745 B2 * | 6/2012 | Kondo et al. | .......... | 375/240.16 |
| 8,290,049 B2 * | 10/2012 | Kondo et al. | .......... | 375/240.16 |
| 8,325,814 B2 * | 12/2012 | Koo et al. | .......... | 375/240.16 |
| 8,340,185 B2 * | 12/2012 | Biswas et al. | .......... | 375/240.16 |
| 8,379,725 B2 * | 2/2013 | Kuzuya | .......... | 375/240.16 |
| 2008/0117971 A1 * | 5/2008 | Ramachandran et al. | .......... | 375/240.16 |
| 2008/0117972 A1 * | 5/2008 | Ramachandran et al. | .......... | 375/240.16 |
| 2008/0198934 A1 * | 8/2008 | Hong et al. | .......... | 375/240.22 |
| 2008/0225951 A1 * | 9/2008 | Young et al. | .......... | 375/240.16 |
| 2009/0003457 A1 * | 1/2009 | Liu et al. | .......... | 375/240.25 |
| 2009/0086820 A1 * | 4/2009 | Hong et al. | .......... | 375/240.16 |
| 2009/0115908 A1 * | 5/2009 | Walls | .......... | 348/699 |
| 2009/0115909 A1 * | 5/2009 | Walls et al. | .......... | 348/699 |
| 2010/0329345 A1 * | 12/2010 | Andersson et al. | .......... | 375/240.16 |
| 2012/0275520 A1 * | 11/2012 | Kondo et al. | .......... | 375/240.14 |

* cited by examiner

*Primary Examiner* — Gregory Sefcheck
(74) *Attorney, Agent, or Firm* — Foley & Lardner LLP; Christopher J. McKenna; Daniel Rose

(57) ABSTRACT

Certain aspects of a method and system for motion estimation around a fixed reference vector using a pivot pixel approach may include pivoting each of the plurality of pixels in an output picture to perform a sub-pixel search in a plurality of directions around a reference vector. A plurality of cost values may be calculated for performing motion compensation for a plurality of pixels in the output picture along a plurality of directions around the reference vector. A motion vector may be generated corresponding to the least calculated cost for each pixel in the output picture based on the calculated plurality of cost values.

21 Claims, 8 Drawing Sheets

METHOD AND SYSTEM FOR MOTION ESTIMATION AROUND A FIXED REFERENCE VECTOR USING A PIVOT-PIXEL APPROACH

CROSS-REFERENCE TO RELATED APPLICATIONS/INCORPORATION BY REFERENCE

None

FIELD OF THE INVENTION

Certain embodiments of the invention relate to digital video processing. More specifically, certain embodiments of the invention relate to a method and system for motion estimation around a fixed reference vector using a pivot pixel approach.

BACKGROUND OF THE INVENTION

A major revolution in video display technology includes flat screens based on either liquid crystal display (LCD) or plasma display panel (PDP) technology that are rapidly replacing the cathode ray tube (CRT) technology that served as the primary display device for more than a half a century. A significant consequence of the new video display technologies is that pictures may now be displayed at higher picture-rates with progressive scanning on a flat screen. The new video display technologies may also facilitate a faster transition from standard definition television (SDTV) to high-definition television (HDTV). However, legacy video compression systems still use formats with lower picture-rates and may be unable to optimally display legacy video on modern display screens.

An artifact known as "motion judder" may occur when the picture rate of a video sequence is excessively low. Motion judder may occur when the temporal sampling rate is too low to describe motion in a scene. The objects in input pictures may be shifted on either side of a required output picture. A temporal digital filter interpolation method may be used to determine pixel intensity values. The signals describing motion of each of the objects within a scene may be referred to as motion vectors. Each pixel or region with the same movement may be allocated a motion vector. The motion estimation system may determine these motion vectors and failing to find a correct motion vector and/or misusing the motion vector in a picture rate converter may lead to noticeable artifacts. When large camera movements occur, regions of a picture close to the borders may have significantly less reliable motion vectors than those closer to the middle and special processing may be required at the picture boundaries.

Telecine is a process that may be used to transfer film sequences to television. Telecine may involve a vertical low-pass Kell-factor filtering of a source image followed by a frame-rate conversion through field repetition. For NTSC, the first 3 fields may be received from the first film frame, followed by 2 fields from the second film frame, followed by 3 fields from the third film frame and so on. The non-uniformity of frames may cause motion judder. In cases where the telecine transfer maps the same number of fields to a single frame, a blurring or stuttering phenomenon may be present because of low temporal resolution of the source images and the near-simultaneous display of two temporally-disparate images.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for motion estimation around a fixed reference vector using a pivot pixel approach, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for motion estimation around a fixed reference vector using a pivot pixel approach. Certain aspects of a method may comprise pivoting each of the plurality of pixels in an output picture to perform a sub-pixel search in a plurality of directions around a reference vector. A plurality of cost values may be calculated for performing motion compensation for a plurality of pixels in the output picture along a plurality of directions around the reference vector. A motion vector may be generated corresponding to the least calculated cost for each pixel in the output picture based on the calculated plurality of cost values.

Figure 1:
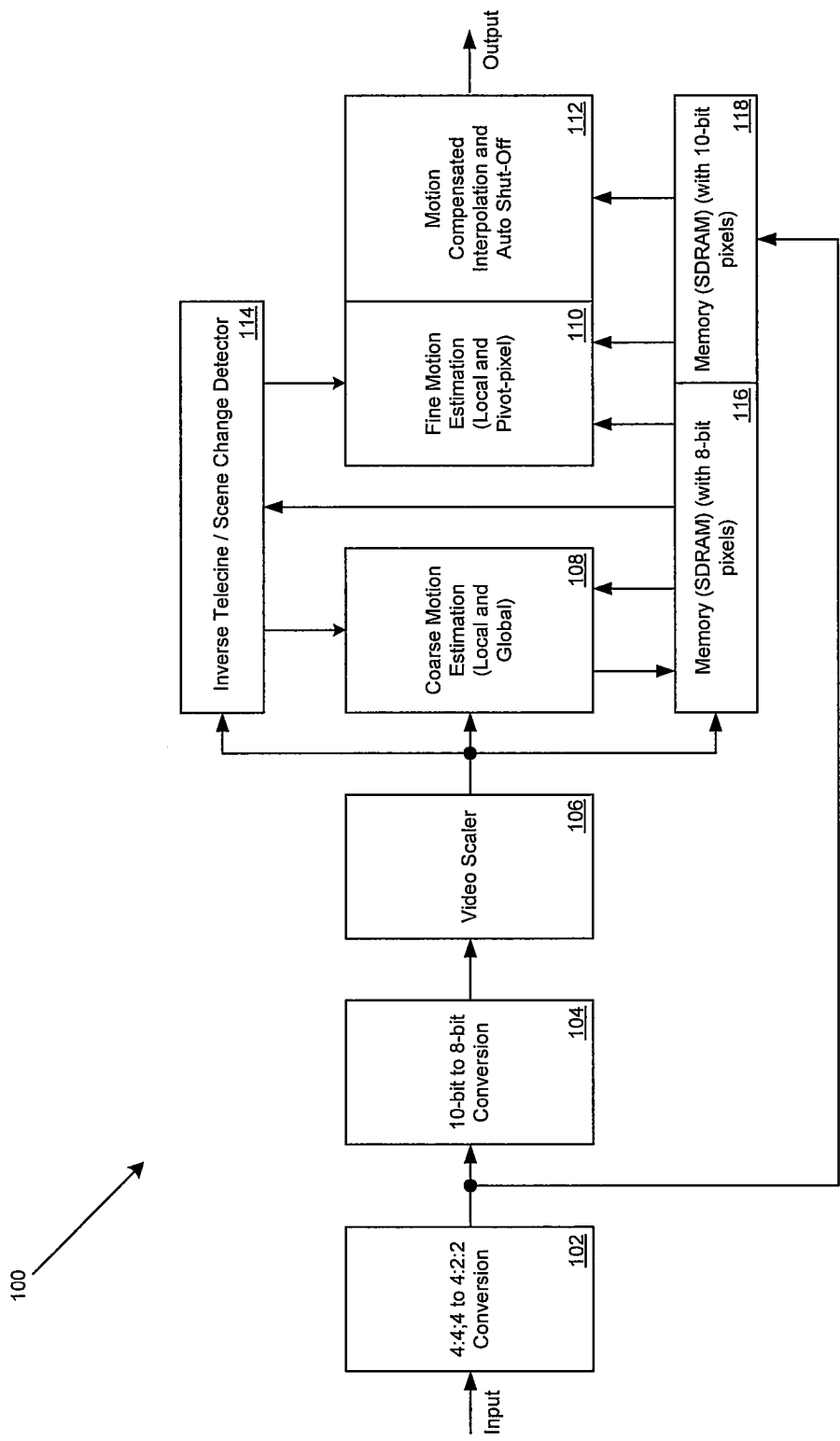
FIG. 1 is a block diagram of an exemplary motion judder cancellation system, in accordance with an embodiment of the invention.

FIG. 1 is a block diagram of an exemplary motion judder cancellation system, in accordance with an embodiment of the invention. Referring to FIG. 1, there is shown a motion judder cancellation system 100. The motion judder cancellation system 100 may comprise a video conversion block 102, a bit conversion block 104, a video scaler 106, a coarse motion estimation block 108, a fine motion estimation block 110, a motion compensated interpolation and auto shut-off block 112, an inverse telecine block 114, a memory portion with 8-bit pixels 116 and a memory portion with 10-bit pixels 118.

The video conversion block 102 may comprise suitable logic, circuitry and/or code that may be enabled to convert the received video in 4:4:4 format to 4:2:2 format. The bit conversion block 104 may comprise suitable logic, circuitry and/or code that may be enabled to convert received 10-bit video data to 8-bit video data, for example. The video scaler 106 may comprise suitable logic, circuitry and/or code that may be enabled to scale the received 8-bit video data by modifying the resolution of the received video data and generate a scaled video output to the inverse telecine block 114, the coarse motion estimation block 108 and the memory portion with 8-bit pixels 116.

The inverse telecine block 114 may comprise suitable logic, circuitry and/or code that may be enabled to detect a cadence with 3:2 pulldown and perform motion estimation on the received picture. The inverse telecine block 114 may be enabled to detect scene changes in the received video pictures and determine whether to repeat pictures for the duration of the scene change. The inverse telecine block 114 may be enabled to create a meta-data descriptor associated with each video field. The meta-data descriptor may comprise information that may be necessary for hardware and/or firmware and/or software to make correct decisions of field pairing to form frames, for example, interlaced or progressive coding of frames, and telecine patterns.

The memory region with 8-bit pixels 116 may comprise suitable logic, circuitry and/or code that may be enabled to receive and store the scaled video input and the generated local and global motion vectors. The memory region with 8-bit pixels 116 may comprise suitable logic, circuitry and/or code that may be enabled to output the generated local and global motion vectors to the inverse telecine block 114 and the fine motion estimation block 110. The memory region with 10-bit pixels 118 may comprise suitable logic, circuitry and/or code that may be enabled to receive and store the converted input video. The memory region with 10-bit pixels 118 may be enabled to output the converted input video to the fine motion estimation block 110 and the motion compensated interpolation and auto shut-off block 112.

The coarse motion estimation block 108 may comprise suitable logic, circuitry and/or code that may be enabled to generate block motion vectors and a global motion vector and determine the interpolation and filtering modes based on the received scaled input pictures. The coarse motion estimation block 108 may be enabled to accumulate the plurality of block motion vectors in order to estimate a global motion vector (GMV). The coarse motion estimation block 108 may be enabled to sort motion vectors into a histogram and generate the GMV.

The input video data may be a video sequence at a picture rate of X Hz, for example. The output generated may be a video sequence at a picture rate of Y Hz, for example, where Y≥X and Y may match the display picture rate. The coarse motion estimation block 108 may be enabled to utilize a motion vector search algorithm to track motion of objects from one picture to the next picture. The coarse motion estimation block 108 may be enabled to split local and global motion search functions in order to generate candidate motion vectors and their corresponding cost measures.

In accordance with an embodiment of the invention, if a picture does not correspond to a scene change, each block in the picture may be associated with a local motion vector ($v_x$, $v_y$). These local motion vectors, which may have sub-pixel resolution, may be combined together to build a vector field. The local motion search function may determine the forward and backward motion vectors for a given block location, where each vector may have a corresponding cost, for example, sum of absolute differences (SAD). Notwithstanding, the block size for motion estimation may vary, for example, 4×4 or 8×8.

For example, in a scene where a camera follows an airplane flying over a cloudy sky. The global motion may comprise a pan of the camera as it follows the airplane, and the airplane itself may be the object where motion may differ from global motion. A global motion vector may be derived based on a measure of global motion by collecting statistics, for example, a histogram of local motion vectors. Alternatively, the global motion vector may be approximated based on a pixel transformation, such as:

$$v_x = a_{11}x + a_{12}y + b_1$$

$$v_y = a_{21}x + a_{22}y + b_2$$

where (x,y) and ($v_x$, $v_y$) may indicate the position and motion, respectively. The parameters $a_{11}, a_{12}, b_1$ and $a_{21}, a_{22}, b_2$ may be estimated by local motion vector samples using a least squares method, for example.

The fine motion estimation block 110 may comprise suitable logic, circuitry and/or code that may be enabled to refine the motion vectors extracted from the received video stream and decompose the block motion vectors into pixel motion vectors. The fine motion estimation block 110 may be enabled to perform a local refinement search and the motion vectors may be refined to sub-pixel precision, for example. The fine motion estimation block 110 may be enabled to accumulate the plurality of block motion vectors in order to estimate a global motion vector (GMV). The fine motion estimation block 110 may be enabled to sort motion vectors into a histogram and generate the GMV.

The motion compensated interpolation and auto shut-off block 112 may comprise suitable logic, circuitry and/or code that may be enabled to utilize the scaled local and global motion vectors and the decoded and/or received pictures to generate the interpolated or inserted pictures. The motion compensated interpolation and auto shut-off block 112 may be enabled to generate a plurality of output pictures based on filtering a generated shut-off value, the generated plurality of interpolated pictures and a repeated pixel value. The shut-off value may be generated based on comparison of the calculated difference with one or more cut-off threshold values. A reduced interpolation mode may be utilized if a generated cut-off value is less than an entry threshold value and/or above an exit threshold value.

Figure 2:
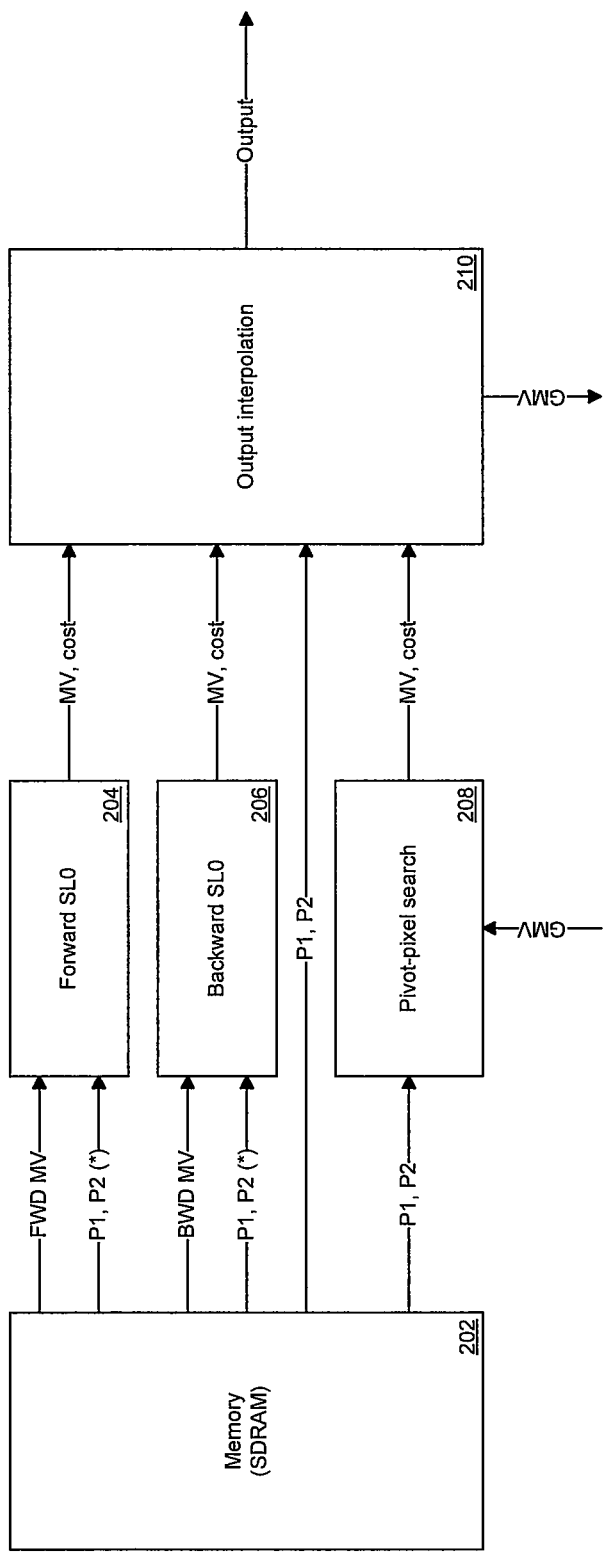
FIG. 2 is a block diagram of an output stage of an exemplary motion judder cancellation system, in accordance with an embodiment of the invention.

FIG. 2 is a block diagram of an output stage of an exemplary motion judder cancellation system, in accordance with an embodiment of the invention. Referring to FIG. 2, there is shown a memory 202, a forward search level 0 block 204, a backward search level 0 block 206, a pivot pixel search block 208 and an output interpolation block 210.

The memory 202 may comprise suitable logic, circuitry and/or code that may be enabled to output a plurality of generated forward motion vectors and their corresponding previous and next pictures, P1 and P2 respectively to the forward search level 0 block 204. The memory 202 may be enabled to output a plurality of backward motion vectors and their corresponding previous and next pictures, P1 and P2 respectively to the backward search level 0 block 206. The memory 202 may be enabled to output the previous and next pictures, P1 and P2 respectively to the pivot pixel search block 206 and the output interpolation block 210.

The forward search level 0 block 204 may comprise suitable logic, circuitry and/or code that may be enabled to receive generated forward motion vectors and calculate a cost for performing motion compensation for a particular block or pixel along the generated forward motion vectors and output the generated forward motion vectors and the corresponding cost to the output interpolation block 210.

The backward search level 0 block 206 may comprise suitable logic, circuitry and/or code that may be enabled to receive generated backward motion vectors and calculate a cost for performing motion compensation for a particular block or pixel along the generated backward motion vectors and output the generated backward motion vectors and the corresponding cost to the output interpolation block 210.

The pivot pixel search block 208 may comprise suitable logic, circuitry and/or code that may be enabled to receive the previous and next pictures, P1 and P2 respectively and a generated global motion vector (GMV) from the coarse motion estimation block 108, for example, and generate a pivot pixel motion vector. The pivot pixel search block 208 may be enabled to calculate a cost for performing motion compensation for a particular block or pixel along the generated pivot pixel motion vector and output the generated pivot pixel motion vector (pivp_mvx, pivp_mvy) and the corresponding cost (pivp_cost) for each pixel in the output picture to the output interpolation block 210.

The pivot-pixel search block 208 may be enabled to receive a reference vector, for example, a global motion vector and two source pictures, for example, a previous input picture and a next input picture, and perform a sub-pixel search in a plurality of directions around the reference vector. If a suitable match is found, the matching vector may be used for motion-compensated interpolation. Notwithstanding, the reference vector may be enabled to change depending on a particular region on a screen. In accordance with another embodiment of the invention, a plurality of pivot-pixel searches may be processed in parallel and a least cost vector may be selected from the plurality of pivot-pixel searches. The pivot-pixel search may be performed once as it is symmetric, rather than twice as is the case with search level 0 with separate forward and backward direction searches. The pivot pixel search block 208 may be enabled to pivot each of the plurality of pixels in an output picture to perform a sub-pixel search in a plurality of directions around the reference vector, for example, global motion vector.

The output interpolation block 210 may comprise suitable logic, circuitry and/or code that may be enabled to receive the generated forward, backward and pivot pixel motion vectors (FSL0 MV), (BSL0 MV) and (pivp_mvx, pivp_mvy) respectively and the corresponding costs (FSL0 cost), (BSL0 cost) and (pivp_cost) respectively associated with performing motion compensation for a particular block or pixel along the generated motion vectors. The output interpolation block 210 may be enabled to select a motion vector from the plurality of generated forward, backward and pivot pixel motion vectors based on the least calculated cost for performing motion compensation along each of the plurality of generated motion vectors.

The Poutput interpolation block 210 may be enabled to select a plurality of motion compensated pixels corresponding to the selected motion vector. The output interpolation block 210 may be enabled to generate a plurality of interpolated pictures and a global motion vector based on a calculated difference between the selected plurality of motion compensated pixels.

Figure 3A:
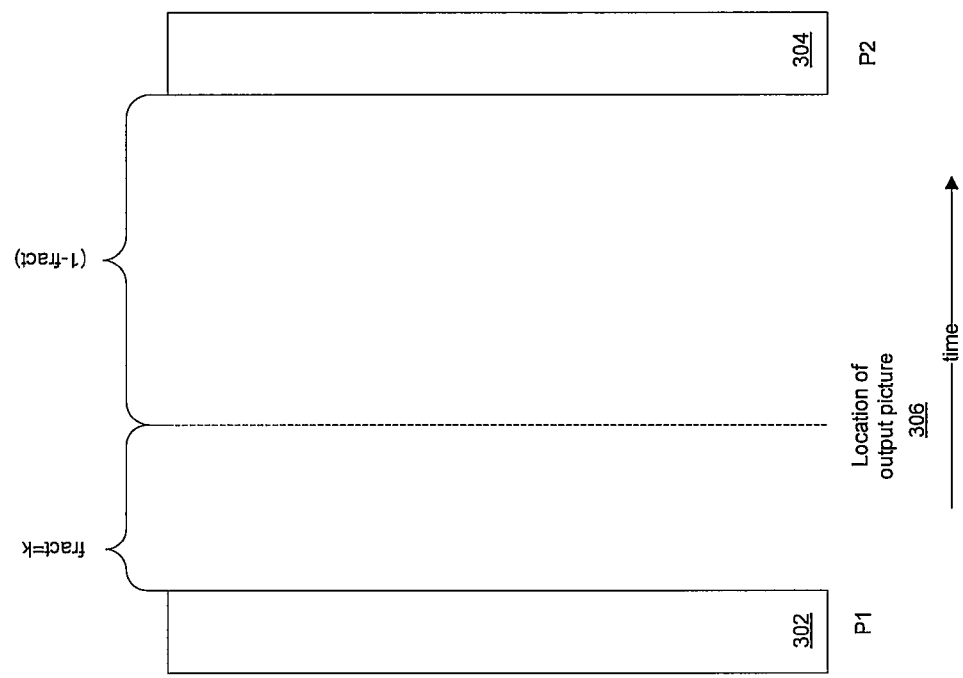
FIG. 3A is a block diagram illustrating location of an exemplary output picture between two pictures, in accordance with an embodiment of the invention.

FIG. 3A is a block diagram illustrating location of an exemplary output picture between two pictures, in accordance with an embodiment of the invention. Referring to FIG. 3A, there is shown a plurality of source pictures, for example, a previous input picture P1 302 and a next input picture P2 304 and the location of an output picture 306. For example, the output picture 306 may be located k time units from the previous input picture P1 302.

Figure 3B:
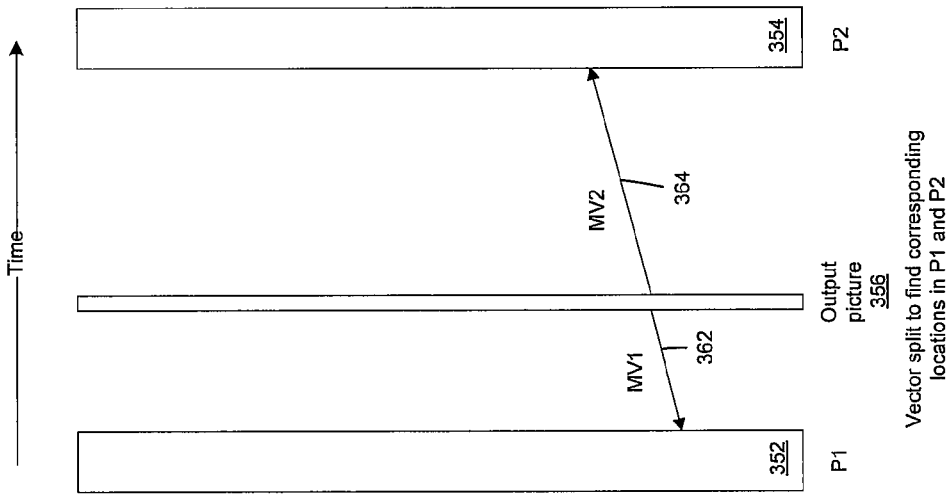
FIG. 3B is a block diagram illustrating exemplary projection of an output vector to reference a pixel in an output picture, in accordance with an embodiment of the invention.
Figure 3B:
Figure 3B:
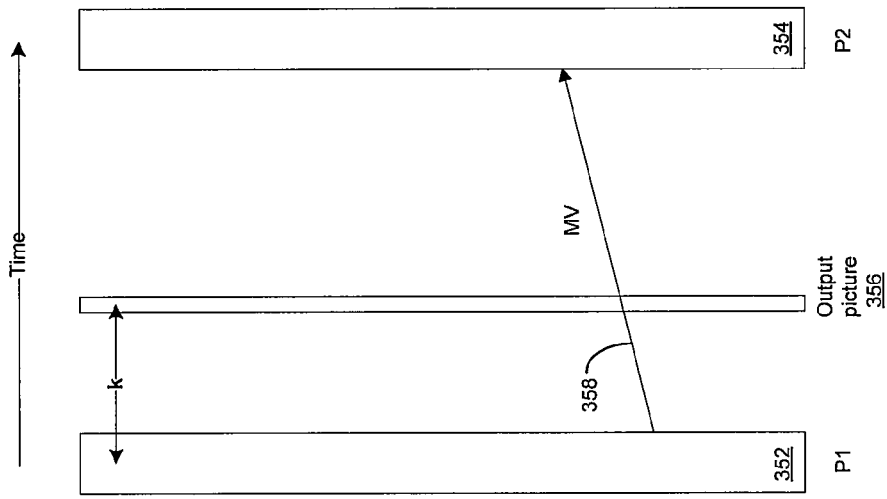

FIG. 3B is a block diagram illustrating exemplary projection of an output vector to reference a pixel in an output picture, in accordance with an embodiment of the invention. Referring to FIG. 3B, there is shown a plurality of source pictures, for example, a previous input picture P1 352 and a next input picture P2 354 and an output picture 356. For example, the output picture 356 may be located k time units from the previous input picture P1 352.

A motion vector MV 358 may point from an area in the previous input picture P1 352 to an area in the next input picture P2 354, in such a way that the motion vector MV 358 may capture the motion that occurred between the two original pictures P1 352 and P2 354.

The motion vector MV 358 may be split into two motion vectors, for example, MV1 362 and MV2 364. Each of the estimated motion vectors, for example, motion vector MV 358 may be split and scaled for motion compensated interpolation. The directions of the two scaled motion vectors, for example, MV1 362 and MV2 364 may be opposite to each other. The length of the scaled motion vector, for example, MV1 362 may be proportional to the temporal difference between the output picture 356 and the previous input picture P1 352. The length of the scaled motion vector, for example, MV2 364 may be proportional to the temporal difference between the output picture 356 and the next input picture P2 354.

The pivot-pixel search may take into account the relative position or fract value k of the output picture 356 compared to the two input pictures, P1 352 and P2 354. In one embodiment of the invention, the search range may be +/−4 qpel, for example, horizontally and vertically around the reference vector. In such a case, a total of 81 different locations may be searched, for example. The reference vector may be expressed in terms of qpel units from one input picture to the next.

A plurality of offsets may be precomputed into each of the two input pictures, P1 352 and P2 354. An appropriate offset may be calculated in between frame times for each of the 81 different vectors, for example. Each candidate MV 358 may be projected into an integer location in the output picture 356 and the pivot-pixel output motion vector may be aligned with a pixel in the output picture 356.

Figure 4:
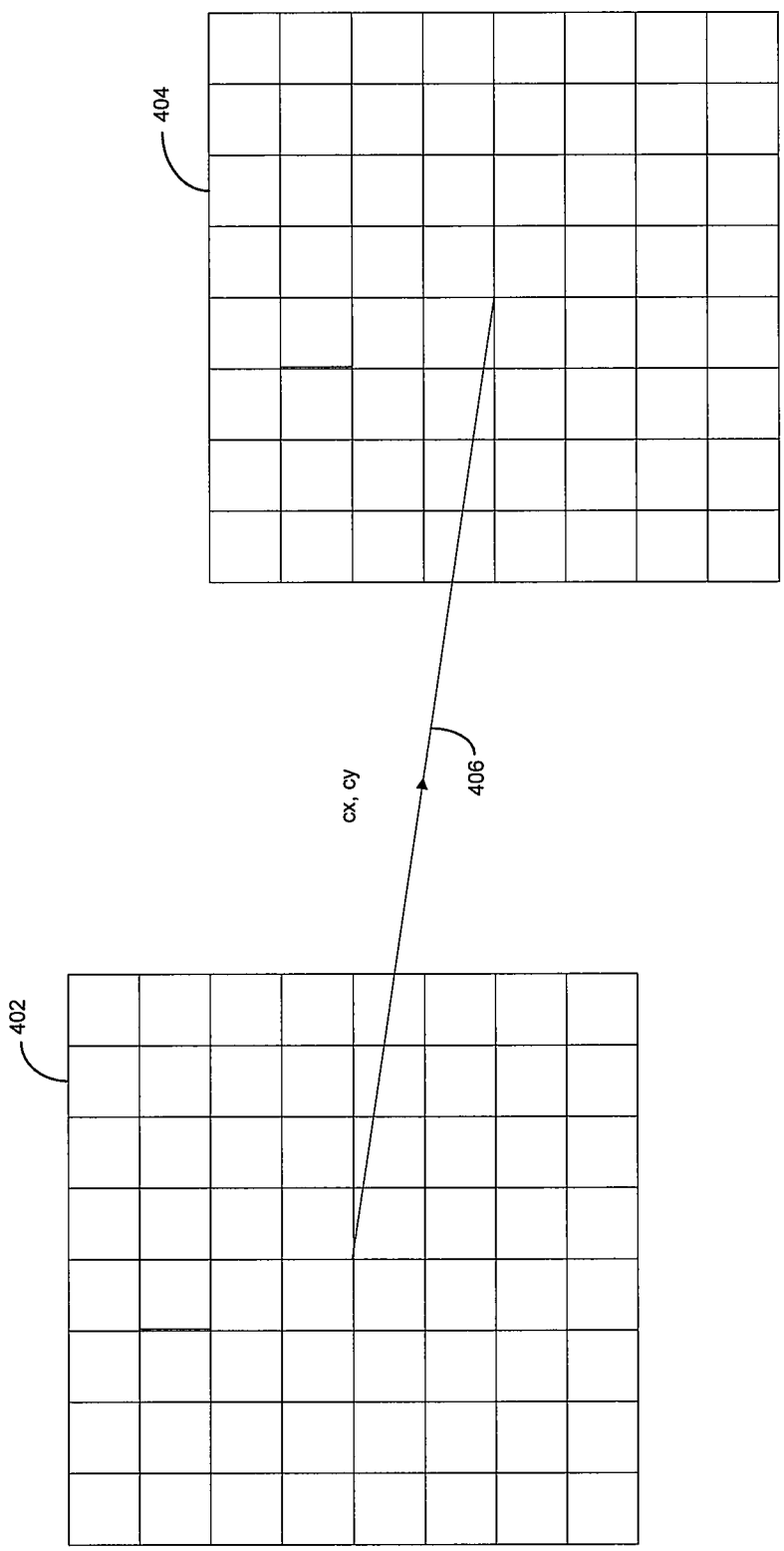
FIG. 4 is a block diagram illustrating exemplary cost calculation of performing motion compensation around a candidate motion vector, in accordance with an embodiment of the invention.

FIG. 4 is a block diagram illustrating exemplary cost calculation of performing motion compensation around a candidate motion vector, in accordance with an embodiment of the invention. Referring to FIG. 4, there is shown a sum of absolute differences (SAD) calculation of a block 402 in the previous input picture P1 352, a SAD calculation of a block 404 in the next input picture P2 354 and a projected vector 406.

The pivot-pixel search may be performed utilizing, for example, an 8-pixel by 8-pixel SAD along a plurality of directions around the reference vector. The blocks 402 and 404 may be centered along the projected vector 406. The projected pixel may not be included in the SAD calculation, but the projected pixel may be implicitly included because of sub-pixel computation of SAD. Notwithstanding, other sizes of blocks may be utilized for SAD calculations.

In another embodiment of the invention, chroma components of the previous input picture 352 and the next input picture P2 354 may be used in the SAD calculation when a particular bit, for example, USE_CHROMA_SAD_PIV-PGMV bit is set. Each of the calculated plurality of cost values may comprise calculating an absolute difference of a luma component of a previous input picture P1 352 and a luma component of a next input picture P2 354 when a sum of luma components of the previous input picture P1 352 and the next input picture P2 354 is below a threshold value, for example, LAGMV_USE_CHROMA_LUMA_THRESH.

For example, for a particular pixel, an absolute difference value may be calculated according to the following equation:

$$absdiff=|P1\_y(x,y)-P2\_y(x+vx,y+vy)|$$

if (P1_y(x, y)+P2_y(x+vx, y+vy))<LAGMV_USE_CHROMA_LUMA_THRESH

Similarly, each of the calculated plurality of cost values may comprise calculating a SAD of a luma component of a previous input picture P1 352 and a luma component of a next input picture P2 354 and absolute differences of chroma components of the previous input picture P1 352 and chroma components of the next input picture P2 354 when a sum of luma components of the previous input picture P1 352 and the next input picture P2 354 is above the threshold value, for example, LAGMV_USE_CHROMA_LUMA_THRESH.

For example, for a particular pixel, an absolute difference value may be calculated according to the following equation:

$$absdiff=|P1\_y(x,y)-P2\_y(x+vx,y+vy)|+(|P1\_u(x,y)-P2\_u(x+vx,y+vy)|+|P1\_v(x,y)-P2\_v(x+vx,y+vy)|)/2$$

if (P1_y(x, y)+P2_y(x+vx, y+vy))≥LAGMV_USE_CHROMA_LUMA_THRESH where P1_y(x, y) is the luma component of the previous input picture P1 and P1_u(x, y) and P1_v(x, y) are the quarter-pixel resolution chroma components of the previous input picture P1.

In one embodiment of the invention, the pivot pixel search range may be +/−4 qpel, for example, horizontally and vertically around the reference vector 406. In such a case, a total of 81 locations may be searched, for example. The reference vector 406 may be expressed in terms of qpel units from the previous input picture P1 to the next input picture P2.

The SAD may be computed over the 8×8 blocks 402 and 404 over 81 values, for example, for (vx, vy) on the plurality of output pixels (x, y) according to the following equations:

$$SAD(x, y, vx, vy) = \sum_{i=0}^{7}\sum_{j=0}^{7} absdiff\left(x + \frac{x\_off1}{4} + j, y + \frac{y\_off1}{4} + i, vx, vy\right)$$

where the offset values, x_off1 and y_off1 may be determined for each (vx, vy) pair. The x_off1 and y_off1 values may be expressed in qpel units and may be divided by 4, although the absolute difference value may be calculated using quarter-pixel-resolution samples.

The pivot pixel search algorithm may be initialized by calculating the offset values, x_off1 and y_off1 for each of the 81 locations for both P1 and P2. The offset values may be calculated by projecting each motion vector 358 through integer locations in the output picture 356. A set of candidate vectors (vx, vy) may be derived from the qpel-resolution input reference vector (gx, gy) according to the following equations:

$$vx \in [(4 \cdot gx)-4, (4 \cdot gx)+4]$$

$$vy \in [(4 \cdot gy)-4, (4 \cdot gy)+4]$$

$$fwd\_mx2=(1-fract)*vx;$$

$$fwd\_my2=(1-fract)*vy;$$

$$fwd\_mx1=fwd\_mx2-vx;$$

$$fwd\_my1=fwd\_my2-vy;$$

where fwd_mx1, fwd_my1 and fwd_mx2, fwd_my2 are offsets into pictures P1 and P2, fract may be a relative position of the output picture 356 from the previous input picture P1 352, and vx, vy may be a candidate motion vector. The offsets may be defined relative to the current output pixel (x, y).

Figure 6:
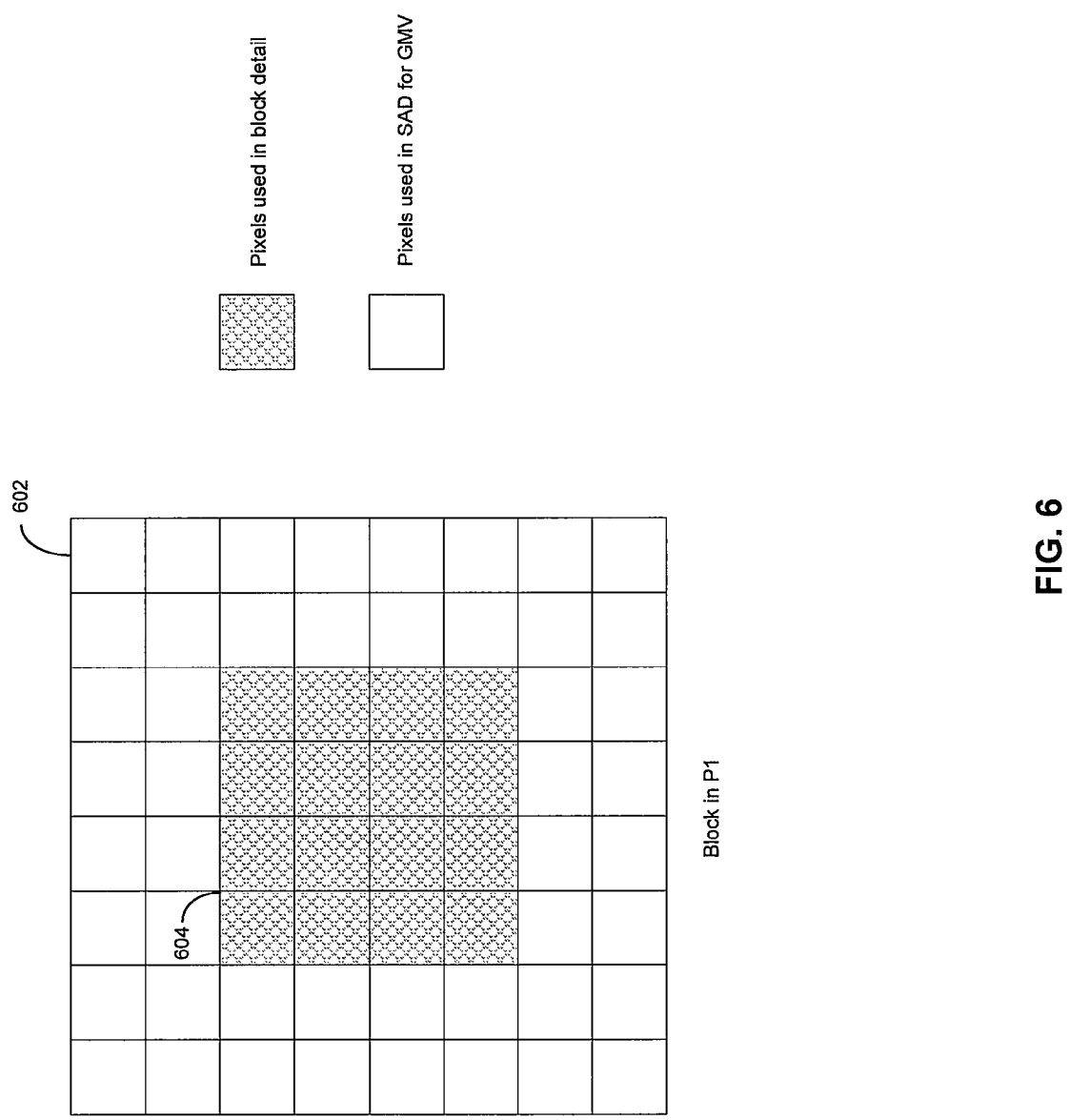
FIG. 6 is a block diagram illustrating exemplary pixel utilized for block detail calculation, in accordance with an embodiment of the invention.

In one embodiment of the invention, the offset values may be calculated to point to the upper left corner of block 502 in FIG. 6. The values for fwd_mx1, fwd_mx2, fwd_my1, and fwd_my2 may be rounded to and specified in quarter-pixel units, for example. The x and y offset values may be calculated according to the following equations:

$$x\_off1=fwd\_mx1-18; \text{ (by subtracting } 4\tfrac{1}{2} \text{ qpels in } x \text{ direction)}$$

$$y\_off1=fwd\_my1-14; \text{ (by subtracting } 3\tfrac{1}{2} \text{ qpels in } y \text{ direction)}$$

$$x\_off2=fwd\_mx2-18;$$

$$y\_off2=fwd\_my2-14;$$

The plurality of offset values (x_off1, y_off1) and (x_off2, y_off2) may be calculated for each candidate motion vector (vx, vy).

Figure 5:
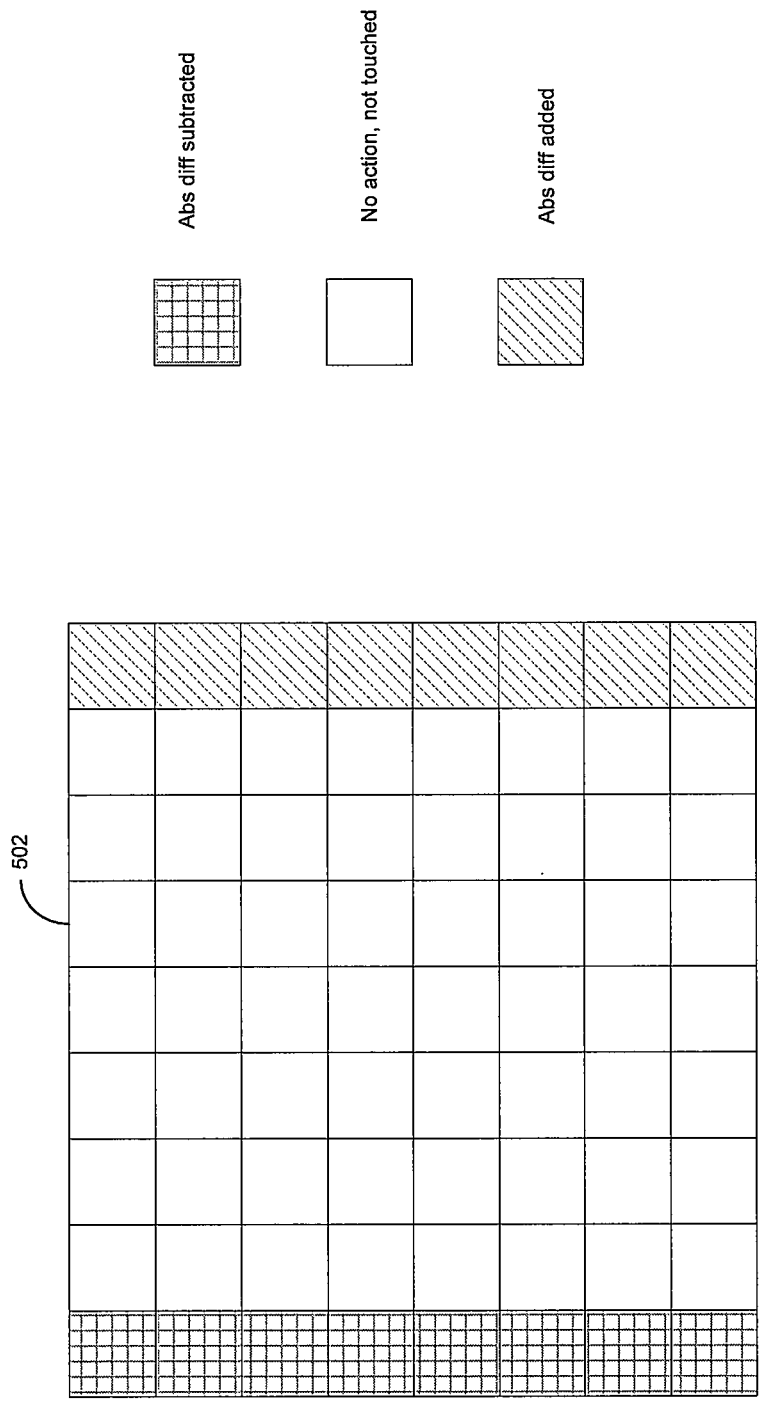
FIG. 5 is a block diagram illustrating exemplary pipelining of calculated cost values, in accordance with an embodiment of the invention.

FIG. 5 is a block diagram illustrating exemplary pipelining of calculated cost values, in accordance with an embodiment of the invention. Referring to FIG. 5, there is shown a SAD calculation of a block 502. The pivot pixel search block 208 may be enabled to pipeline the calculated SAD of each of the plurality of pixels in the output picture 356 along the plurality of directions around the reference vector, for example, global motion vector, MV 358.

The SAD calculation of a block 402 in the previous input picture P1 may be buffered in a buffer. The SAD may be calculated for the pixels with a different absolute differences value. The number of absolute differences calculations may be reduced by a factor of 8, for example. The pipelining of the SAD calculation may be represented according to the following equation:

$$SAD(x, y, vx, vy) = SAD(x - 1, y, vx, vy) +$$
$$\sum_{i=0}^{7} absdiff\left(x + \frac{x\_off1}{4} + 8, y + \frac{y\_off1}{4} + i, vx, vy\right) -$$
$$\sum_{i=0}^{7} absdiff\left(x + \frac{x\_off1}{4}, y + \frac{y\_off1}{4} + i, vx, vy\right)$$

The pipelined pivot-pixel search may be performed in a plurality of directions around the reference vector, for example, global motion vector, MV 358. The pivot-pixel search may be enabled to scan the source pictures and calculate a plurality of cost values of performing motion compensation for a plurality of pixels in the output picture 356 along a plurality of directions around the reference vector, for example, a global motion vector, MV 358. The pivot pixel search block 208 may be enabled to generate a motion vector, for example, pivot pixel motion vector (pivp_mvx, pivp_mvy) and the corresponding cost (pivp_cost) for each pixel in the output picture 356 based on the calculated plurality of cost values.

In accordance with an embodiment of the invention, if a pivot-pixel search extends beyond a picture boundary, the edge pixels may be replicated. The SAD values may be calculated at the beginning of each line. The SAD values may be calculated at an output location of (−40, 0), for example, by selecting a reference vector range of +/−36 pixels horizontally and a block size of 8×8, for example. In one embodiment, the subtraction part of the SAD pipeline may be disabled during the first 8 output pixels.

In accordance with an embodiment of the invention, if the reference vector 358 +/−4 qpels extends beyond an allowable search range in search level 0, for example, beyond +/−36 pixels horizontally and/or +/−8 pixels vertically, the search locations beyond the allowable range may not be searched. If the input reference vector is (0, 0), the search output may be optionally not used and a signal may be communicated to a GMV selection block indicating that a zero-based full pixel search may be performed to select the next GMV.

FIG. 6 is a block diagram illustrating exemplary pixel utilized for block detail calculation, in accordance with an embodiment of the invention. Referring to FIG. 6, there is shown a block 602 in the previous input picture P1 352 and a block 604 that may be utilized for block detail calculation.

The block detail may be utilized to avoid forcing low-contrast objects in the direction of the reference vector because of a strong bias. The block detail may be calculated around a 4×4 block 604 in the previous input picture P1 projected along the reference vector. The block detail value may comprise a difference between a maximum luma component and a minimum luma component of each of a particular number of blocks in a previous input picture P1 352. A plurality of offset values may be calculated according to the following equations:

$$bd\_mx2 = (1-fract)*gx;$$

$$bd\_my2 = (1-fract)*gy;$$

$$bd\_mx1 = bd\_mx2 - gx;$$

$$bd\_my1 = bd\_my2 - gy;$$

The top-left pixel in the block 604 may be defined according to the following equations:

$$bd\_x = bd\_mx1 - 1.5 \text{ by rounding to nearest full pel}$$

$$bd\_y = bd\_my1 - 1.5 \text{ by rounding to nearest full pel}$$

These offset values may be relative to the current output pixel (x, y). The block detail may be calculated over a window from P1_y(x+bd_x, y+bd_y) to P1_y(x+bd_x+3, y+bd_y+3) according to the following equation:

$$block\_detail = \MAX_{\substack{0 \le i < 4 \\ 0 \le j < 4}}(P1\_y(bd\_x+i, bd\_y+j)) - \MIN_{\substack{0 \le i < 4 \\ 0 \le j < 4}}(P1\_y(bd\_x+i, bd\_y+j))$$

Notwithstanding, the block detail may be computed using other methods. For example, a measure of high-frequency content in a block may be computed by calculating a sum of absolute values of the first derivatives dLuma/dx and dLuma/dy for each pixel in a block. The sum of absolute derivatives may be scaled using a similar MAX-MIN method, for example, as illustrated herein.

The final cost pivp_cost may be calculated from the least SAD value. The least SAD value may be scaled as the hierarchy may use 4×4 blocks and the pivot-pixel search may use 8×8 blocks. The pivot pixel cost may be calculated according to the following equations:

$$scaled\_SAD = least\_SAD/4;$$

$$pivpgmv\_cost = scaled\_SAD + GMV\_BIAS\_THRESH-\\OLD - CLAMP(block\_detail - BLOCK\_\\DETAIL\_THRESHOLD, 0, BLOCK\_\\DETAIL\_MAX)*BLOCK\_DETAIL\_MULT;$$

where GMV_BIAS_THRESHOLD may be a bias threshold value, BLOCK_DETAIL_THRESHOLD may be a block detail threshold value and BLOCK_DETAIL_MULT may be a multiple of the block detail. The plurality of threshold values may be stored in one or more registers.

In the pivot pixel search, the output pixel may be projected along the motion vector 358 and the generated motion vector may represent a true motion along the motion vector 358. The pivot pixel search may be enabled to reduce halo artifacts caused by displacing motion vectors to create a region of support. A plurality of large block sizes may be searched inexpensively because of the pipelining of SAD calculations. The pivot pixel search may be tolerant to small phase shifts in the horizontal or vertical direction.

Figure 7:
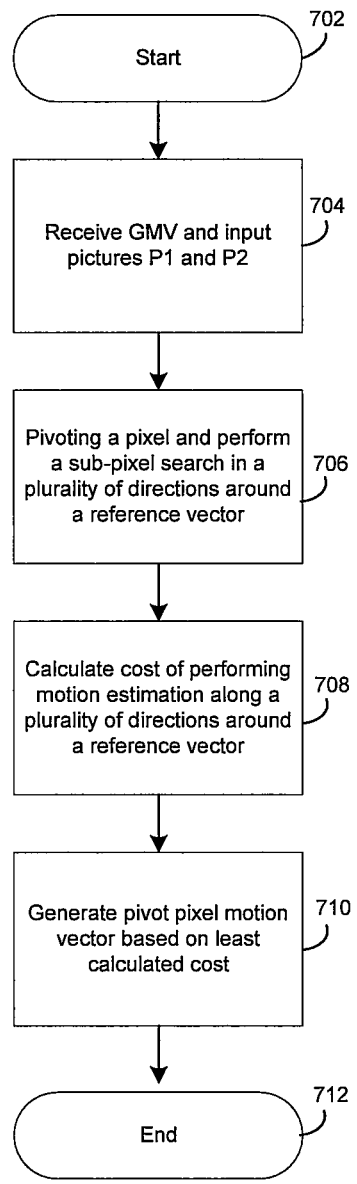
FIG. 7 is a flowchart illustrating exemplary steps for motion estimation around a fixed reference vector using a pivot pixel approach, in accordance with an embodiment of the invention.

FIG. 7 is a flowchart illustrating exemplary steps for motion estimation around a fixed reference vector using a pivot pixel approach, in accordance with an embodiment of the invention. Referring to FIG. 7, exemplary steps may begin at step 702. In step 704, the pivot pixel search block 208 may be enabled to receive a global motion vector, a previous input picture P1 352 and a next input picture P2 354. In step 706, each of the plurality of pixels in the output picture 356 may be pivoted to perform a sub-pixel search in a plurality of directions around the reference vector, for example, global motion vector, MV 358. In step 708, a plurality of cost values for performing motion compensation for a plurality of pixels in an output picture 356 along a plurality of directions around a reference vector, for example, a global motion vector, MV 358 may be calculated. In step 710, a motion vector, for example, pivot pixel motion vector (pivp_mvx, pivp_mvy) may be generated and the corresponding cost (pivp_cost) for each pixel in the output picture 356 may be selected based on the calculated plurality of cost values. Control then passes to end step 712.

In accordance with an embodiment of the invention, a method and system for motion estimation around a fixed reference vector using a pivot pixel approach may comprise a pivot pixel search block 208 that may be enabled to calculate a plurality of cost values of performing motion compensation for a plurality of pixels in an output picture 356 along a plurality of directions around a reference vector, for example, a global motion vector, MV 358. The pivot pixel search block 208 may be enabled to generate a motion vector, for example, pivot pixel motion vector (pivp_mvx, pivp_mvy) and the corresponding cost (pivp_cost) for each pixel in the output picture 356 based on the calculated plurality of cost values. The pivot pixel search block 208 may be enabled to pivot each of the plurality of pixels in the output picture 356 to perform a sub-pixel search in a plurality of directions around the reference vector, for example, global motion vector, MV 358.

The calculated plurality of cost values may comprise calculating a sum of absolute differences (SAD) of each of the plurality of pixels in the output picture 356 along the plurality of directions around the reference vector, for example, global motion vector, MV 358. The pivot pixel search block 208 may be enabled to pipeline the calculated SAD of each of the plurality of pixels in the output picture 356 along the plurality of directions around the reference vector, for example, global motion vector, MV 358. The pivot pixel search block 208 may be enabled to select a particular SAD value corresponding to a least cost value among the calculated plurality of cost values. The pivot pixel search block 208 may be enabled to scale the selected particular sum SAD value. The pivot pixel search block 208 may be enabled to generate a cost value based on one or more of: the scaled SAD value and a block detail value.

The block detail value may comprise a difference between a maximum luma component and a minimum luma component of each of a particular number of blocks in a previous input picture P1 352. Each of the calculated plurality of cost values may comprise calculating an absolute difference of a luma component of a previous input picture P1 352 and a luma component of a next input picture P2 354 when a sum of luma components of the previous input picture P1 352 and the next input picture P2 354 is below a threshold value, for example, LAGMV_USE_CHROMA_LUMA_THRESH. Each of the calculated plurality of cost values may comprise calculating a SAD of a luma component of a previous input picture P1 352 and a luma component of a next input picture P2 354 and absolute differences of chroma components of the previous input picture P1 352 and chroma components of the next input picture P2 354 when a sum of luma components of the previous input picture P1 352 and the next input picture P2 354 is above the threshold value, for example, LAGMV_USE_CHROMA_LUMA_THRESH.

The output interpolation block 210 may be enabled to select a motion vector from one or more of: a generated forward motion vector, a generated backward motion vector and/or said generated motion vector, for example, pivot pixel motion vector (pivp_mvx, pivp_mvy) based on the calculated cost values for performing motion compensation for a particular block in the output picture 356 along each of the generated forward motion vector, backward motion vector and/or the generated motion vector, for example, pivot pixel motion vector (pivp_mvx, pivp_mvy).

Another embodiment of the invention may provide a machine-readable storage, having stored thereon, a computer program having at least one code section executable by a machine, thereby causing the machine to perform the steps as described herein for motion estimation around a fixed reference vector using a pivot pixel approach.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video data, the method comprising:
  receiving a first plurality of local motion vectors associated with a plurality of blocks of a first output picture, the first output picture positioned at a first temporal location between a first input picture and a second input picture;
  generating a first global reference motion vector for the first output picture from analysis of the first plurality of local motion vectors associated with the plurality of blocks of the first output picture;
  pivoting each of a first plurality of pixels in the first output picture to perform a sub-pixel search in a plurality of directions around the first global reference motion vector, wherein the first global reference motion vector points from an area in the first input picture to an area in the second input picture, wherein the sub-pixel search includes a first offset proportional to the first temporal location by projecting the first global reference motion vector through a pixel location in the first output picture being interpolated from the first and second input pictures;
  calculating a plurality of cost values for performing motion compensation for the first plurality of pixels in the first output picture along the plurality of directions around the first global reference motion vector;
  generating a pixel motion vector for a pixel of the first output picture based on the calculated plurality of cost values;
  receiving a second plurality of local motion vectors associated with a plurality of blocks of a second output picture, the second output picture positioned at a second temporal location between a third input picture and a fourth input picture, the second temporal location different from the first temporal location; and
  pivoting each of a second plurality of pixels in the second output picture to perform a second sub-pixel search in a plurality of directions around a generated second global reference motion vector, wherein the second global reference motion vector points from an area in the third input picture to an area in the fourth input picture, wherein the second sub-pixel search includes a second offset proportional to the second temporal location by projecting the second global reference motion vector through a pixel location in the second output picture being interpolated from the third and fourth input pictures.

2. The method according to claim 1, comprising generating each of the calculated plurality of cost values by calculating a sum of absolute differences for each of the first plurality of pixels in the first output picture along the plurality of directions around the first global reference motion vector.

3. The method according to claim 2, comprising pipelining the calculation of the sum of the absolute differences for each of the first plurality of pixels in the first output picture along the plurality of directions around the first global reference motion vector.

4. The method according to claim 1, comprising selecting a particular sum of absolute differences value corresponding to a least cost value among the calculated plurality of cost values.

5. The method according to claim 4, comprising scaling the selected particular sum of absolute differences value.

6. The method according to claim 5, comprising generating each of the plurality of cost values based on one or more of: the scaled selected particular sum of absolute differences value and a block detail value.

7. The method according to claim 6, wherein the block detail value comprises a difference between a maximum luma component and a minimum luma component of each of a particular number of blocks in the first input picture.

8. The method according to claim 1, comprising generating each of the calculated plurality of cost values by calculating an absolute difference of a luma component of the first input picture and a luma component of the second input picture when a sum of the luma component of the first input picture and the luma component of the second input picture is below a threshold value.

9. The method according to claim 8, comprising generating each of the calculated plurality of cost values by calculating a sum of: absolute differences of the luma component of the first input picture and the luma component of the second input picture and absolute differences of chroma components of the first input picture and chroma components of the second input picture when a sum of the luma component of the first input picture and the luma component of the second input picture is above the threshold value.

10. The method according to claim 1, comprising selecting an output motion vector from at least one of: a generated forward motion vector, a generated backward motion vector, or the generated pixel motion vector based on the calculated cost value for performing motion compensation for a particular block in the first output picture along each of the generated forward motion vector, the generated backward motion vector, or the generated pixel motion vector.

11. A system for processing video data, the system comprising:
one or more circuits configured to receive a first plurality of local motion vectors associated with a plurality of blocks of a first output picture, and receive a second plurality of local motion vectors associated with a plurality of blocks of a second output picture, wherein the first output picture is positioned at a first temporal location between a first input picture and a second input picture and the second output picture positioned at a second temporal location between a third input picture and a fourth input picture, the second temporal location different from the first temporal location;
the one or more circuits are configured to generate a first global reference motion vector for the first output picture from analysis of the plurality of local motion vectors associated with the plurality of blocks of the first output picture and generate a second global reference motion vector for the second output picture from analysis of the plurality of local motion vectors associated with the plurality of blocks of the second output picture;
the one or more circuits are configured to pivot each of a plurality of pixels in the first output picture to perform a sub-pixel search in a plurality of directions around the first global reference motion vector, wherein the first global reference motion vector points from an area in the first input picture to an area in the second input picture, wherein the sub-pixel search includes a first offset proportional to the first temporal location by projecting the first global reference motion vector through a pixel location in the first output picture being interpolated from the first and second input pictures, and pivot each of a second plurality of pixels in the second output picture to perform a second sub-pixel search in a plurality of directions around a generated second global reference motion vector, wherein the second global reference motion vector points from an area in the third input picture to an area in the fourth input picture, wherein the second sub-pixel search includes a second offset proportional to the second temporal location by projecting the second global reference motion vector through a pixel location in the second output picture being interpolated from the third and fourth input picture;
the one or more circuits are configured to calculate a plurality of cost values for performing motion compensation for the first plurality of pixels in the first output picture along the plurality of directions around the first global reference motion vector; and
the one or more circuits are configured to generate a first pixel motion vector for a pixel of the first output picture based on the calculated plurality of cost values.

12. The system according to claim 11, wherein the one or more circuits are configured to generate each of the calculated plurality of cost values by calculating a sum of absolute differences for each of the first plurality of pixels in the first output picture along the plurality of directions around the first global reference motion vector.

13. The system according to claim 12, wherein the one or more circuits are configured to receive the calculation of the sum of the absolute differences for each of the first plurality of pixels in the first output picture along the plurality of directions around the first global reference motion vector.

14. The system according to claim 11, wherein the one or more circuits are configured to select a particular sum of absolute differences value corresponding to a least cost value among the calculated plurality of cost values.

15. The system according to claim 14, wherein the one or more circuits are configured to scale the selected particular sum of absolute differences value.

16. The system according to claim 15, wherein the one or more circuits are configured to generate each of the plurality of cost values based on one or more of: the scaled selected particular sum of absolute differences value and a block detail value.

17. The system according to claim 16, wherein the block detail value comprises a difference between a maximum luma component and a minimum luma component of each of a particular number of blocks in the first input picture.

18. The system according to claim 11, wherein the one or more circuits are configured to generate each of the calculated plurality of cost values by calculating an absolute difference of a luma component of the first input picture and a luma component of the second input picture when a sum of the luma component of the first input picture and the luma component of the second input picture is below a threshold value.

19. The system according to claim 18, wherein the one or more circuits are configured to generate each of the calculated plurality of cost values by calculating a sum of: absolute differences of the luma component of the first input picture and the luma component of the second input picture and absolute differences of chroma components of the first input picture and chroma components of the second input picture when a sum of the luma component of the first input picture and the luma component of the second input picture is above the threshold value.

20. The system according to claim 11, wherein the one or more circuits are configured to select an output motion vector from at least one of: a generated forward motion vector, a generated backward motion vector, or the generated pixel motion vector based on the calculated cost value for performing motion compensation for a particular block in the first output picture along each of the generated forward motion vector, the generated backward motion vector, or the generated pixel motion vector.

21. A non-transitory machine-readable storage having stored thereon, a computer program having at least one code section for processing video data, the at least one code section being executable by a machine for causing the machine to perform steps comprising:

receiving a first plurality of local motion vectors associated with a plurality of blocks of a first output picture, the first output picture positioned at a first temporal location between a first input picture and a second input picture;

generating a first global reference motion vector for the first output picture from analysis of the first plurality of local motion vectors associated with the plurality of blocks of the first output picture;

pivoting each of a first plurality of pixels in the first output picture to perform a sub-pixel search in a plurality of directions around the first global reference motion vector, wherein the first global reference motion vector points from an area in the first input picture to an area in the second input picture, wherein the sub-pixel search includes a first offset proportional to the first temporal location by projecting the first global reference motion vector through a pixel location in the first output picture being interpolated from the first and second input pictures;

calculating a plurality of cost values for performing motion compensation for the first plurality of pixels in the first output picture along the plurality of directions around the first global reference motion vector;

generating a pixel motion vector for a pixel of the first output picture based on the calculated plurality of cost values;

receiving a second plurality of local motion vectors associated with a plurality of blocks of a second output picture, the second output picture positioned at a second temporal location between a third input picture and a fourth input picture, the second temporal location different from the first temporal location; and pivoting each of a second plurality of pixels in the second output picture to perform a second sub-pixel search in a plurality of directions around a generated second global reference motion vector, wherein the second global reference motion vector points from an area in the third input picture to an area in the fourth input picture, wherein the second sub-pixel search includes a second offset proportional to the second temporal location by projecting the second global reference motion vector through a pixel location in the second output picture being interpolated from the third and fourth input pictures.

* * * * *